United States Patent [19]

Arnould et al.

[11] Patent Number: 4,679,163
[45] Date of Patent: Jul. 7, 1987

[54] INVERSE DISCRETE COSINE TRANSFORM CALCULATION PROCESSOR

[75] Inventors: Emmanuel Arnould, Villarceaux; Jean-Pierre Dugré, San Clenente, both of France

[73] Assignee: Compagnie Industrielle Des Telecommunications Cit-Alcatel, Paris, France

[21] Appl. No.: 709,857

[22] Filed: Mar. 8, 1985

[30] Foreign Application Priority Data

Mar. 9, 1984 [FR] France ................................ 84 03667

[51] Int. Cl.⁴ ............................................ G06F 15/332
[52] U.S. Cl. ................................................. 364/725
[58] Field of Search ......................... 364/725; 358/133

[56] References Cited

U.S. PATENT DOCUMENTS

| | | | |
|---|---|---|---|
| 4,196,448 | 4/1980 | Whitehouse et al. | 364/725 |
| 4,288,858 | 9/1981 | Merola et al. | 364/725 |
| 4,293,920 | 10/1981 | Merola | 364/725 |
| 4,385,363 | 5/1983 | Widergren et al. | 364/725 |
| 4,449,194 | 5/1984 | Wilhelm | 364/725 |

OTHER PUBLICATIONS

Nussbaumer, "Fast Multidimensional Discrete Cosine Transforms" *IBM Tech. Discl. Bulletin* vol. 23, No. 5, Oct. 1980, pp. 1976–1981.
Nussbaumer, "Improved Approach for the Computation of Multidimensional Cosine Transform" *IBM Tech. Discl. Bulletin* vol. 23, No. 10, pp. 4517–4521.
IEEE Transactions on Communications, vol. COM-25, No. 9, Sep. 1977, W. H. Chen et al "A Fast Computational Algorithm for the Discrete Cosine Transform" pp. 1004–1009.
IEEE Transactions on Electromagnetic Compatibility, vol. EMC-24, No. 2, May 1982, A. Jalali et al: "A High Speed FDCT Processor for Real Time Processing of NTSC Color TV Signal", p. 278-286.
IEEE Transactions on Computers, vol. C-31, No. 9, Sep. 1982, F. A. Kamangar et al "Fast Algorithsm for the 2-D Discrete Cosine Transforms" pp. 899–906.

*Primary Examiner*—David H. Malzahn
*Attorney, Agent, or Firm*—Sughrue, Mion, Zinn, Macpeak & Seas

[57] ABSTRACT

An inverse discrete cosine transform calculation processor, for processing television picture signals, comprises a processor module consisting of four successive stages. The first stage comprises a multiplier associated with a sine and cosine function value store which is connected to one of its input buses. Each of the other three stages comprises an adder/subtracter having two input buses each selectively connected to the output bus of the directly preceding stage or to the output bus of an input register of this stage also loaded from the output bus of the directly preceding stage and which features on the output bus of one of the input registers of the fourth stage an internal loopback bus which with an input bus of the module is selectively connected to the second input bus of the multiplier.

3 Claims, 3 Drawing Figures

INVERSE DISCRETE COSINE TRANSFORM CALCULATION PROCESSOR

BACKGROUND OF THE INVENTION

1. Field of the Invention

The present invention relates to inverse discrete cosine transform calculation processors, employed in particular in systems for decompressing and decoding digital television picture signals received over limited bandwidth links.

2. Description of the Prior Art

The use of digital coding and compression techniques for processing television picture signals to be transmitted without significant degradation over limited bandwidth links is already known. Certain of these techniques provide for real time processing of a television picture signal and yield satisfactory results both with regard to transmitted picture quality and the compression ratio obtained, using two-dimensional discrete cosine transform calculations. For the purposes of such calculations, the television picture signal is divided into successive matrix blocks of $N \times N$ non-overlapping digital picture elements. These blocks are converted into successive sets of $N \times N$ two-dimensional discrete cosine transform coefficients which, quantified and coded, are then transmitted over the line.

At the receiving end, the matrix blocks of $N \times N$ digital picture elements used to reconstitute the original television picture signal are restored by calculating the two-dimensional inverse discrete cosine transform of the successive sets of $N \times N$ coefficients themselves restored by decoding the received signal.

Whether it concerns the discrete cosine transform or the inverse transform, the two-dimensional transform calculation reduces to one-dimensional transform calculations of the same kind, of the discrete cosine transform in the first case and of the inverse transform in the second case.

A one-dimensional forward or inverse transform is calculated by carrying out a time sequence of real operations in the form of an algorithm.

An article entitled "A Fast Computational Algorithm for the Discrete Cosine Transform" by Wen-Hsiung Chen, C Harrison Smith and S C Fralick published in IEEE Transactions on Communications, September 1977 gives an algorithm for calculating the discrete cosine transform of a sequence of N data points applicable for $N=2n$ with n equal to or greater than 2. This algorithm breaks down the processing of the N data points of the sequence to be transformed in order to obtain the N corresponding transformed data points or coefficients, ignoring a normalization factor, into a limited number of successive stages each yielding N results. This algorithm, which is of the "butterfly" algorithm type, is illustrated by a diagram which is bidirectional, ignoring the aforementioned normalization factor, which means that it also illustrates, for the direction from the coefficients towards the initial data, the sequence of successive stages enabling the N initial data points to be obtained from the N coefficients.

A co-pending application with the same assignee describes a discrete cosine transform calculation processor architecture bsed on the use of a modified algorithm derived from the aforementioned known algorithm, referred to hereinafter as the algorithm of W H Chen et al.

An object of the present application is to define a simple inverse discrete cosine transform calculation processor architecture employing an algorithm derived from that as previously modified by the same assignee for calculating the discrete cosine transform which yields a very simple, compact and readily integrated final structure.

SUMMARY OF THE INVENTION

The present invention consists in an inverse discrete cosine transform calculation processor for calculating the transform of a sequence of N digital data points also called coefficients where $N=2^n$ and n is an integer greater than two, comprising four successive calculation stages each assigned to a single operation and together constituting a processor module controlled by a programmed store, wherein a first stage, the module input stage, comprises a multiplication unit connected to an associated addressable store holding sine and cosine function values and an input multiplexer selectively connecting an input bus of the module receiving said coefficients or a loopback bus internal to the module to said multiplication unit, said multiplication unit delivering the successive results obtained over a stage output bus, and each of the second, third and fourth stages comprises an addition/subtraction unit having two input buses and a stage output bus, the output bus of said fourth stage constituting the output bus of the module, two addressable storage registers loaded from the output bus of the stage immediately preceding the stage concerned on its input side, and two stage input multiplexers each selectively connecting the output bus of said preceding stage or the output bus of one of the registers of the stage concerned to one of the input buses of said addition/subtraction unit of that stage, said loop back bus being connected to the output bus of one of the addressable storage registers of said fourth stage.

In accordance with another characteristic of the invention, a processor of this kind for calculating the two-dimensional transform of matrix blocks of $N \times N$ coefficients corresponding to the forward transform of matrix blocks of $N \times N$ digital picture elements of a picture signal further comprises a set of first, second and third stores associated with said processor module and individually controlled in read and write modes by said programmed store and a respective incoming and outgoing words transfer multiplexer and a respective store addressing multiplexer for each store controlled simultaneously by said programmed store, said incoming and outgoing word transfer multiplexers providing, in two processing sequences, for all three stores, selective connection of said first store in read mode, then said second store in read mode to said input bus of said module, while during these same sequences said second store in write mode then said third store in write mode are connected to the output bus of said module and said addressing multiplexers transmit to said stores, during these same sequences, the successive read or write addresses of each store, as supplied by said programmed store.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
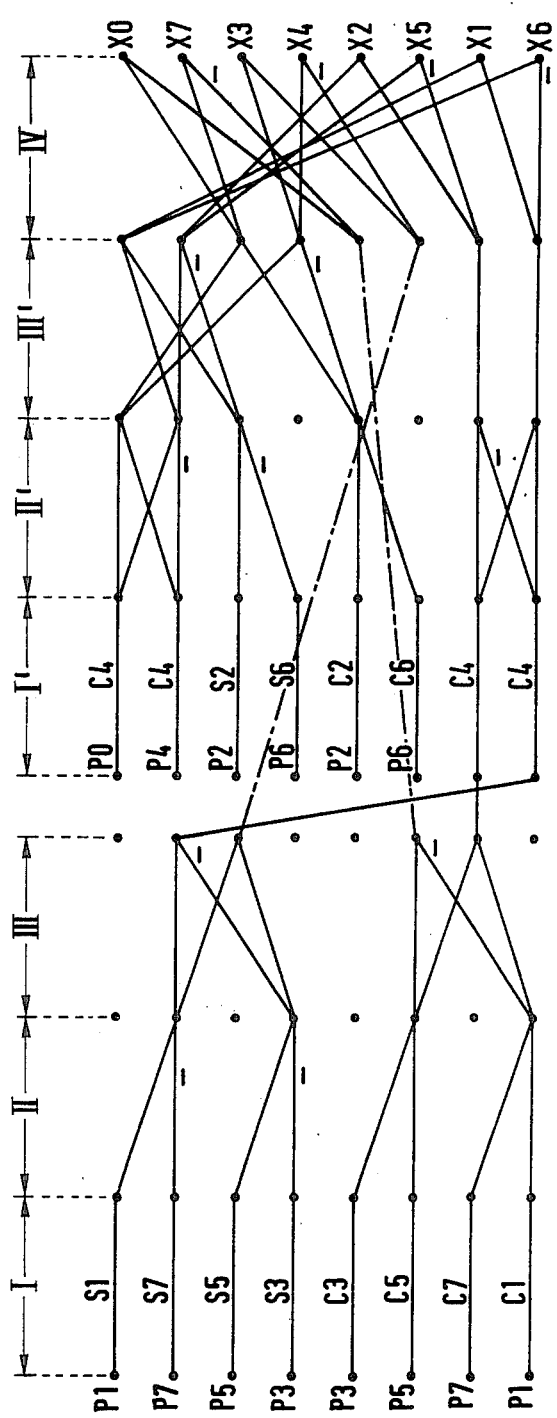
FIG. 1 diagrammatically represents a modified algorithm in accordance with the present invention for calculating the one-dimensional inverse discrete cosine transform.

In FIG. 1, the diagram of the modified algorithm in accordance with the invention for calculating the inverse discrete cosine transform of a sequence of N coefficients Pi where i=0, 1, ... N−1 and N=8, for example resulting from the forward transform of a sequence of N digital data points Xi, shows that the reconstitution of the N digital data points Xi is effected by means of successive stages of processing applied to the N coefficients Pi which constitute the input data. Each of the stages is divided into eight operating cycles (for N=8) during which derived intermediate results or final processing results, that is to say the eight data points Xi, may be delivered. The successive stages are denoted I, II, III, I', II', III' and IV. They consist:

in the case of the first stage I, in applying multiplication operations to four of the input data points Pl, P7, P5, P3 repeated twice and defined values of cosine and sine functions denote Ci and Si where Ci=cos iπ/16 and Si=sin iπ/16, in the case of the second stage II, in applying addition or subtraction operations to appropriate pairs of intermediate results obtained in stage I, in the case of the third stage III, in applying addition or subtraction operations to appropriate pairs of the results obtained in stage II;

in the case of the fourth stage I', in multiplying the four other input data points P0, P4, P2 and P6, repeated for certain of them, and results obtained in stage III by defined values Ci and Si of cosine and sine functions, in the case of the fifth stage II', in applying addition or subtraction operations to appropriate pairs of results from stage I', in the case of the sixth stage III', in applying addition or subtraction operations to appropriate pairs of results from stage II', and in the case of the seventh and final stage IV, in applying addition or subtraction operations to appropriate pairs of results from stage III' or III.

The eight data points Xi corresponding to the coefficients Pi are obtained at the end of processing stage IV, during the operating cycles of this stage.

Figure 2:
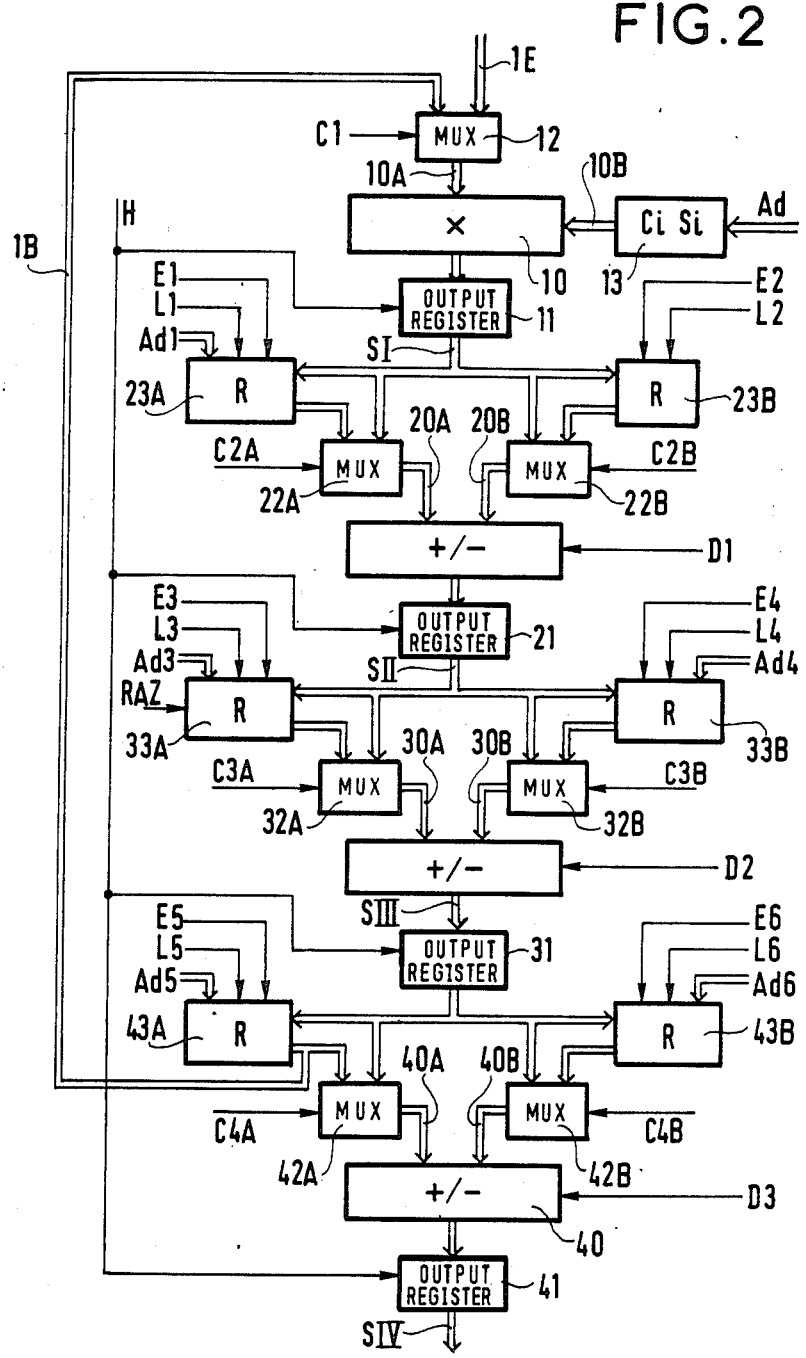
FIG. 2 shows a one-dimensional inverse discrete cosine transform calculation processor also called processor module in accordance with the invention, employing the algorithm of FIG. 1.

The calculation processor shown in FIG. 2 carries out the successive calculations shown in the diagram of FIG. 1, exploiting the similarity of the successive stages I, II and III with the successive stages I', II' and III', the processes of which may be executed by the same circuits, and the possibility of using the results from stage III during stage I' in the case of some of them and those of stage III' during stage IV in the case of the remainder of them. The resulting structure of the processor is simplified in consequence and constitutes a processor module which can be integrated.

Thus, the calculation processor shown in FIG. 2 comprises four successive calculation stages processing the eight input coefficients. These stages essentially comprise, in the case of the first or module input stage, a multiplication unit 10 and, in the case of each of the second, third and fourth stages, an addition/subtraction unit designated 20, 30 or 40 according to the stage concerned. The results produced in any stage are delivered by a stage output register, denoted 11, 21, 31 or 41 according to the stage concerned, triggered on an edge of a clock signal H.

These multiplication units 10 and addition/subtraction units 20, 30 and 40 each have two input buses identified by the reference of the unit concerned with the suffix A or B. Each has an output bus connected to the associated output register, designated by the letter S accompanied by the suffix I, II, III or IV used, with or without the "prime" symbol ('), to designate the processing stage being executed in the diagram given in FIG. 1. The output bus SIV of the fourth or module output stage constitutes the output bus of the module on which are delivered the eight picture elements corresponding to the eight input coefficients. The addition/subtraction units 20, 30 and 40 each further receive an addition/subtraction control signal designated D1, D2 or D3 according to the unit 20, 30 or 40 concerned.

In this processor module, the multiplier circuit 10 of the first stage has one of its input buses 10A selectively connected by a stage input multiplexer circuit 12 controlled by a signal C1 either to an input bus 1E of the module receiving said coefficients or to a bus internal to the module called the loopback bus 1B. It has its second input bus 10B connected to an associated addressable store 13 holding cosine and sine function values, storing defined values Ci and Si of the functions where Ci=cos iπ/16 and Si=sin iπ/16 for N=8 and controlled by a store read address signal Ad.

In this processor module the addition/subtraction unit 20, 30 or 40 of each of the second, third and fourth stages has each of its input buses also selectively connected by a stage input multiplexer circuit either to the output bus of the directly preceding stage or to the output bus of an input addressable storage register of the stage concerned.

Thus, in the second stage, two multiplexer circuits 22A, 22B controlled by respective signals C2A, C2B selectively connect, in the case of one of them the output bus SI or the output bus of a storage register 23A to the input bus 20A and in the case of the other of them the output bus SI or the output bus of a register 23B to the other input bus 20B of the addition/subtraction unit 20. These two storage registers 23A and 23B are loaded from the output bus SI. Each is able to store a plurality of results output over the output bus SI of the first stage and may consequently comprise a plurality of register stages R. In the example described, one of the storage registers, 23A, consists of two register stages R to provide for simultaneously storing two results issued on SI, the other , 23B, consisting of only one register stage R. These storage registers are individually controlled in write mode by a signal E1 for the register 23A and E2 for the register 23B and in read mode by a signal L1 for the register 23A and L2 for the register 23B. The storage register 23A is also controlled by an addressing signal Ad1, for loading it and retrieving one of the stored results.

In an analogous manner, two multiplexer circuits 32A and 32B and two addressable storage registers 33A and 33B are associated with the addition/subtraction unit 30 and two other multiplexer circuits 42A and 42B and two other addressable storage registers 43A and 43B are associated with the addition/subtraction unit 40. These multiplexer circuits are individually controlled by respective signals C3A, C3B, C4A and C4B. The storage registers are also individually controlled by write, read and addressing control signals respectively designated by the references E, L and Ad followed by the suffix 3 in the case of the register 33A, 4 in the case of the register 33B, 5 in the case of the register 43A and 6 in the case of the register 43B. These storage registers are also able to memorize a plurality of the results issued on the output bus of the immediately preceding stage and consequently comprise a plurality of register stages R. In the example described, the storage registers 33A and 33B each consist of two register stages R, the storage register 43A of four register stages R and the storage register 43B of three register stages R. Furthermore, the storage register 43A is controlled by a signal RAZ to reset to zero an addressed one of its stages R.

The output bus of one of the addressable storage registers of the module output stage, that is the storage register 43A, is further connected by the loopback bus 1B to the input multiplexer circuit 12 of the module input stage.

The external addressing, write, read and reset to zero control signals applied to the individual storage registers 23A, 23B, 33A, 33B, 43A and 43B, the addressing signal of the cosine and sine store 13, the control signals D1, D2 and D3 of the addition/subtraction units 20, 30 and 40 and the control signals C1, C2A, C2B, C3B, C4A and C4B of the multiplexer circuits are advantageously delivered by a programmed control store (not shown). The input data to be processed, that is to say the coefficients to be processed, and the clock signal H defining the operator cycles for the output of the intermediate or final results are delivered by a main controller circuit (not shown) also driving the programmed control store.

In this structure, all the data buses except the output bus of the module SIV are 12 bits wide; this output bus SIV is 8 bits wide and delivers the digital data points Xi reconstituted by the module on 8 bits.

The operation of the processor module and the execution of the processing which it applies to the input coefficients are represented in Tables I and II hereinafter, with reference to successive operating cycles 1, 2, 3, ... defined by the signal H. In these tables there has been indicated for a sequence of eight coefficients Pi to be processed where, i=0, 1, ... 7 applied to the input bus 10A of the multiplier circuit 10 from the input bus 1E of the module during all or part of the two series of eight operating cycles H the successive results denoted in particular by Ni, Mi, Li and Xi obtained at the outputs SI to SIV of the various stages and those stored in the respective stages R of the storage registers. There is also outlined the identical execution of the processing applied to a new sequence of coefficients succeeding the preceding one at the input of the processor module assigned to the continuous processing of a succession of such sequences, the coefficients and results relating to this new sequence which appear in these tables being designated by the same references as their counterparts in the preceding sequence accompanied by the "prime" symbol (').

TABLE I

| H | 10A | SI | 23A R1 | 23A R2 | 23B R | 20A | 20B | SII | 33A R1 | 33A R2 | 33B R1 | 33B R2 | 30A | 30B | SIII |
|---|---|---|---|---|---|---|---|---|---|---|---|---|---|---|---|
| 1 | P1 | . | . | . | . | . | . | . | . | . | . | . | . | . | . |
| 2 | P7 | P1 S1 | . | . | . | . | . | . | . | . | . | . | . | . | . |
| 3 | P5 | P7 S7 | P1 S1 | . | . | P1 S1 | P7 S7 | . | . | . | . | . | . | . | . |
| 4 | P3 | P5 S5 | P1 S1 | . | . | . | . | N4 | . | . | . | . | . | . | . |
| 5 | P3 | P3 S3 | P5 S5 | . | . | P5 S5 | P3 S3 | . | N4 | . | . | . | . | . | . |
| 6 | P5 | P3 C3 | P5 S5 | . | . | . | . | N5 | N4 | . | . | . | N4 | N5 | . |
| 7 | P7 | P5 C5 | P3 C3 | . | . | P3 S3 | P5 C5 | . | N4 | . | N5 | . | N4 | N5 | M5 |
| 8 | P1 | P7 C7 | P3 C3 | . | . | . | . | N6 | N4 | . | N5 | . | . | . | M4 |
| 9 | P0 | P1 C1 | P7 C7 | . | . | P7 C7 | P1 C1 | . | N6 | . | N5 | . | . | . | . |
| 10 | P4 | P0 C4 | P7 C7 | . | . | . | . | N7 | N6 | . | N5 | . | N6 | N7 | . |
| 11 | P2 | P4 C4 | P0 C4 | . | . | P0 C4 | P4 C4 | . | N6 | . | N7 | . | -N6 | N7 | M7 |
| 12 | P6 | P2 S2 | P0 C4 | . | P4 C4 | P0 C4 | P4 C4 | M0 | N6 | . | N7 | . | . | . | M6 |
| 13 | P2 | P6 S6 | P0 C4 | P2 S2 | P4 C4 | P2 S2 | P6 S6 | M1 | M0 | . | N7 | . | . | . | . |
| 14 | P6 | P2 C2 | P0 C4 | P2 S2 | P4 C4 | . | . | M2 | M0 | M1 | N7 | . | M1 | M2 | . |
| 15 | M6 | P6 C6 | P2 C2 | P2 S2 | P4 C4 | P2 C2 | P6 C6 | . | M0 | M1 | M2 | . | M1 | M2 | L1 |
| 16 | M5 | M6 C4 | P2 C2 | P2 S2 | P4 C4 | . | . | M3 | M0 | M1 | M2 | . | M0 | M3 | L2 |
| 17 | P'1 | M5 C4 | M6 C4 | P2 S2 | P4 C4 | M6 C4 | M5 C4 | . | M0 | 0 | M2 | M3 | M0 | M3 | L0 |
| 18 | P'7 | P'1 S1 | M6 C4 | P2 S2 | M5 C4 | M6 C4 | M5 C4 | L5 | M0 | 0 | M2 | M3 | L5 | 0 | L3 |
| 19 | P'5 | P'7 S7 | P'1 S1 | P2 S2 | M5 C4 | P'1 S1 | P'7 S7 | L6 | M0 | 0 | L5 | M3 | L6 | 0 | L5 |
| 20 | P'3 | P'5 S5 | P'1 S1 | P2 S2 | M5 C4 | . | . | N'4 | M0 | 0 | L5 | L6 | . | . | L6 |
| 21 | P'3 | P'3 S3 | P'5 S5 | P2 S2 | M5 C4 | P'5 S5 | P'3 S3 | . | N'4 | 0 | L5 | L6 | . | . | . |
| 22 | P'5 | P'3 C3 | P'5 S5 | P2 S2 | M5 C4 | . | . | N'5 | N'4 | 0 | L5 | L6 | N'4 | N'5 | . |
| 23 | P'7 | P'5 C5 | P'3 C3 | P2 S2 | M5 C4 | P'3 S3 | P'5 C5 | . | N'4 | 0 | N'5 | L6 | N'4 | N'5 | M'5 |
| 24 | P'1 | P'7 C7 | P'3 C3 | P2 S2 | M5 C4 | . | . | N'6 | N'4 | 0 | N'5 | L6 | . | . | M'4 |
| 25 | P'0 | P'1 C1 | P'7 C7 | P2 S2 | M5 C4 | P'7 C7 | P'1 C1 | . | N'6 | 0 | N'5 | L6 | . | . | . |
| 26 | P'4 | P'0 C4 | P'7 C7 | P2 S2 | M5 C4 | . | . | N'7 | N'6 | 0 | N'5 | L6 | N'6 | N'7 | . |
| 27 | P'2 | P'4 C4 | P'0 C4 | P2 S2 | M5 C4 | P'0 C4 | P4 C4 | . | N'6 | 0 | N'7 | L6 | N'6 | N'7 | M'7 |

TABLE II

| H | 43A R1 | 43A R2 | 43A R3 | 43A R4 | 43B R1 | 43B R2 | 43B R3 | 40A | 40B | SIV |
|---|---|---|---|---|---|---|---|---|---|---|
| 1 | . | . | . | . | . | . | . | . | . | . |
| 2 | . | . | . | . | . | . | . | . | . | . |
| 3 | . | . | . | . | . | . | . | . | . | . |
| 4 | . | . | . | . | . | . | . | . | . | . |
| 5 | . | . | . | . | . | . | . | . | . | . |
| 6 | . | . | . | . | . | . | . | . | . | . |
| 7 | . | . | . | . | . | . | . | . | . | . |
| 8 | M5 | . | . | . | . | . | . | . | . | . |
| 9 | M5 | . | . | . | L4 | . | . | . | . | . |
| 10 | M5 | . | . | . | L4 | . | . | . | . | . |
| 11 | M5 | . | . | . | L4 | . | . | . | . | . |
| 12 | M5 | M6 | . | . | L4 | . | . | . | . | . |
| 13 | M5 | M6 | . | . | L4 | L7 | . | . | . | . |
| 14 | M5 | M6 | . | . | L4 | L7 | . | . | . | . |
| 15 | M5 | M6 | . | . | L4 | L7 | . | . | . | . |
| 16 | M5 | L1 | . | . | L4 | L7 | . | . | . | . |

TABLE II-continued

| H | 43A | | | | 43B | | | 40A | 40B | SIV |
|---|----|----|----|----|----|----|----|-----|-----|-----|
|   | R1 | R2 | R3 | R4 | R1 | R2 | R3 |     |     |     |
| 17 | L2 | L1 | . | . | L4 | L7 | . | L0 | L7 | . |
| 18 | L2 | L1 | L0 | . | L4 | L7 | . | L0 | L7 | X0 |
| 19 | L2 | L1 | L0 | L3 | L4 | L7 | . | L3 | L4 | X7 |
| 20 | L2 | L1 | L0 | L3 | L4 | L5 | . | L3 | L4 | X3 |
| 21 | L2 | L1 | L0 | L3 | L4 | L5 | L6 | L2 | L5 | X4 |
| 22 | L2 | L1 | L0 | L3 | L4 | L5 | L6 | L2 | L5 | X2 |
| 23 | L2 | L1 | L0 | L3 | L4 | L5 | L6 | L1 | L6 | X5 |
| 24 | M'5 | L1 | L0 | L3 | L4 | L5 | L6 | L1 | L6 | X1 |
| 25 | M'5 | L1 | L0 | L3 | L'4 | L5 | L6 | . | . | X6 |
| 26 | M'5 | L1 | L0 | L3 | L'4 | L5 | L6 | . | . | . |
| 27 | M'5 | L1 | L0 | L3 | L'4 | L5 | L6 | . | . | . |

In these tables, the symbol "." represents a "don't care" state and the intermediate results denoted Li, Mi and Ni and the output data points Xi obtained from the coefficients Pi may be defined as follows:

| | |
|---|---|
| N0 = P0 | M0 = N0 C4 + N1 C4 |
| N1 = P4 | M1 = N0 C4 − N1 C4 |
| N2 = P2 | M2 = N2 S2 − N3 S6 |
| N3 = P6 | M3 = N2 C2 + N3 C6 |
| N4 = P1 S1 − P7 S7 | M4 = N4 + N5 |
| N5 = P5 S5 − P3 S3 | M5 = N4 − N5 |
| N6 = P3 C3 + P5 C5 | M6 = N6 + N7 |
| N7 = P7 C7 + P1 C1 | M7 = N6 − N7 |
| L0 = M0 + M3 | X0 = L0 + L7 |
| L1 = M1 + M2 | X1 = L1 + L6 |
| L2 = M1 − M2 | X2 = L2 + L5 |
| L3 = M0 − M3 | X3 = L3 + L4 |
| L4 = M4 | X4 = L3 − L4 |
| L5 = M6 C4 − M5 C4 | X5 = L2 − L5 |
| L6 = M6 C4 + M5 C4 | X6 = L1 − L6 |
| L7 = M7 | X7 = L0 − L7 | where $C_i = \cos i\pi/16$ and $S_i = \sin i\pi/16$ with $i = 1, 2, \ldots 7$.

These two tables show how this processor module comprising a single multiplier circuit, three adder/subtracters, 14 stages of storage register each with a capacity of one 12-bit word, seven bus multiplexers and a cosine and sine value store executes the various calculations sequentially on the eight coefficients of successive sequences of eight coefficients, these sequences possibly being, for example, successive rows from a matrix block of 8×8 coefficients. This structure provides for a one-dimensional transform calculation on the eight coefficients of each row which are applied to it in two successive series of eight cycles, denoted 1 through 16, delivering the corresponding output data points in eight operating cycles denoted 18 through 25, preceded by eight operating cycles 10 through 17 with no output result. To the block of 64 coefficients received at the processor input on 128 successive clock cycles there will therefore correspond a block of 64 output data points produced during 128 clock cycles after an overall process initialization carried out on nine clock cycles denoted 1 through 9.

Figure 3:
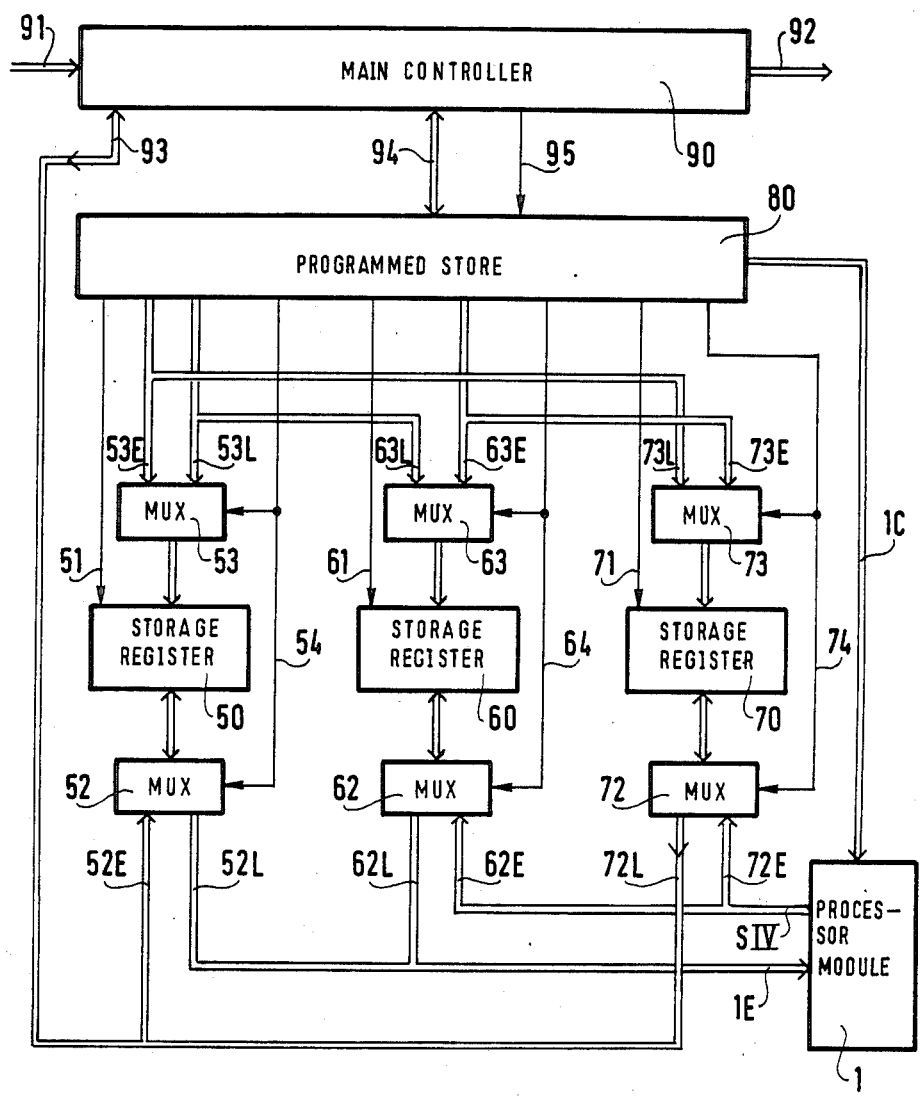
FIG. 3 shows a two-dimensional inverse discrete cosine transform calculation processor based on the module of FIG. 2.

FIG. 3 schematically represents a two-dimensional inverse discrete cosine transform calculation processor adapted to process successive matrix blocks of 8×8 coefficients resulting, for example, from the forward transform of matrix blocks of 8×8 digital picture elements of a television picture signal to produce the corresponding successive blocks of 8×8 picture elements.

This processor is essentially based on the one-dimensional inverse discrete cosine transform calculation processor module. It comprises, in addition to this module designated 1 and identical to that described with reference to FIG. 2, except that here its output bus is 12 bits wide:

three storage registers or addressable stores 50, 60, 70 connected to the module 1, a programmed store 80 controlling the registers 50, 60, 70 and the module 1, and a main controller circuit 90 driving the programmed store 80 and storing the coefficients to be transferred for processing in successive blocks of 64 and further storing the blocks of 64 picture elements produced by the processing.

The processor module 1 is not described again. Its input bus and its output bus are designated by the reference 1E and SIV used in FIG. 2. It is controlled by the programmed store 80 as indicated hereinabove, a control bus 1C carrying these control signals and the signal H from the controller circuit 80.

Each of the storage registers 50, 60 and 70 has the capacity to memorize a block of 8×8 words, that is 64 picture elements each of 8 bits or 64 coefficients each of 12 bits. They are individually controlled in write and read mode by the programmed control store 80 and receive a write/read control signal in the form of logic levels 0/1 on a connection 51, 61, or 71. With each of these storage registers 50, 60, 70 there are associated a first multiplexer 52, 62, or 72 for incoming and outgoing words and a second multiplexer 53, 63 or 73 for the addresses for these words, controlled simultaneously by a control signal delivered by the control programmed store 80 over an individual connection 54, 64 or 74. Each of these addressable stores has an addressing bus and a word input/output bidirectonal bus.

The word multipliexers 52, 62 and 72 are analogous to one another; as schematically represented, each features an input bus for words entering the storage register and an output bus for words leaving the storage register, these buses being designated by the reference for the multiplexer with the suffix E for the storage register incoming words bus or the suffix L for the bus carrying words leaving the register. Their control signal provides a selective connection between their input bus or their output bus and the storage register input/output bidirectional bus. In the case of the multiplexer 52, the input bus 52E is connected to the main controller circuit 90 and the output bus 52L is connected to the input bus 1E of the processor module 1. In the case of the multiplexer 62, the input bus 62E is connected to the output bus SIV of the processor module 1 and its output bus 62L is also connected to the input bus 1E of the processor module 1. In the case of the multiplexer 72, the input bus 72E is connected to the output bus SIV of the processor module 1 and its output bus is connected to the main controller 90.

The address multiplexers 53, 63 and 73 are also analogous to one another. Each has two address input buses connected to the programmed store 80 and designated by the reference for the multiplexer with the suffix E for one of the buses assigned to the addresses for writing incoming words into their storage register and the suffix L for the second bus assigned to the addresses for reading outgoing words out of their storage register. Each features an output bus. They are individually controlled by the signal on the connecton 54, 64 or 74 in order selectively to connect one of their two input buses and their output bus, to deliver either the incoming word write addresses or the outgoing word read addresses.

The controller circuit 90 transfers coefficients in blocks of 64 to the storage register 50, receives the picture elements obtained as a result of the processing carried out from the storage register 70 and monitors the overall process. It has an input bus 91 for the sequences of blocks of coefficients to be processed, an output bus 92 for the reconstituted picture elements, and a bidirectional bus 93 for transferring successive blocks of coefficients from the controller circuit 90 to the storage register 50 and blocks of picture elements from the storage register 70 to the controller circuit 90, this bus 93 being connected to the aforementioned buses 52E and 72L. It further features a general processor control bus 94 to which are applied a signal requesting access from the controller circuit to the storage registers 50 and 70 transmitted to the programmed store 80, associated with a write/read signal in the controller circuit 90, defining the direction of the transfer concerned, and a response signal transmitted to the controller circuit by the programmed store, corresponding to the processor "ready" function. It further provides the clock signal H transmitted over a connection 95 which defines the process timing as well as, over connection which are not shown, the power supplies needed for the processor to operate.

The two-dimensional transform of each block of 8×8 coefficients providing the corresponding block of 8×8 picture elements is calculated in several stages:

a first stage which is an initialization stage and corresponds to the transfer of 8×8 coefficients of the block of coefficients concerned from the controller circuit 90 to the storage register 50, this register 50 being loaded at successive addresses delivered over the bus 53E, a second stage which is a processing stage for calculating the one-dimensional transform of each of the eight rows of eight coefficients, carried out in successive steps by the module 1 receiving the coefficients from the storage register 50 read at successive addresses delivered over the bus 53L and delivering the corresponding results into the storage register 60, loaded at successive addresses delivered over the bus 63E, a third stage which is also a processing stage for calculating the one-dimensional transform of the 64 results of the second stage suitably arranged in eight groups of eight, effected in successive steps by the module 1 receiving from the storage register 60 suitably addressed over the bus 63L the results of the second stage and delivering to the storage register 70 addressed over the bus 73E the resulting picture elements of which only the eight most significant bits are written into the register 70, and a fourth stage which is a final stage for the processing of these 64 coefficients, corresponding to the transfer of the block of 8×8 picture elements from the storage register 70 read and addressed over the bus 73L to the controller circuit 90.

During the third and fourth stages which concern processing of each block of 64 coefficients, the first and second stages concerning the processing of the next block of 64 coefficients also take place.

The present invention has been described with reference to a calculation carried out on sequences of eight coefficients. The same architecture may be used to carry out corresponding calculations on sequences of 16 or more coefficients, adopting for the processor module 1 (FIG. 2) storage registers of appropriate capacity and implementing the appropriate number of loops between the output of one of the storge registers of its fourth stage and the input bus of its multiplier.

It will be understood that various changes in the details, materials and arrangements of parts which have been herein described and illustrated in order to explain the nature of the invention may be made by those skilled in the art within the principle and the scope of the invention as expressed in the appended claims.

There is claimed:

1. Inverse discrete cosine transform calculation processor for calculating the transform of a sequence of N digital data points also called coefficients where $N=2^n$ and n is an integer greater than two, comprising four successive calculation stages each assigned to a single operation and together constituting a processor module controlled by a programmed store, wherein a first stage, the module input stage, comprises a multiplication unit connected to an associated addressable store holding sine and cosine function values and an input multiplexer selectively connecting an input bus of the module receiving said coefficients or a loopback bus internal to the module to said multiplication unit, said multiplication unit delivering the successive results obtained over a stage output bus, and each of the second, third and fourth stages comprises an addition/subtraction unit having two input buses and a stage output bus, the output bus of said fourth stage constituting the output bus of the module, two addressable storage registers loaded from the output bus of the stage immediately preceding the stage concerned on its input side, and two stage input multiplexers each selectively connecting the output bus of said preceding stage or the output bus of one of the registers of the stage concerned to one of the input buses of said addition/subtraction unit of that stage, said loopback bus being connected to the output bus of one of the addressable storage registers of said fourth stage.

2. Processor according to claim 1, for calculating the two-dimensional transform of matrix blocks of N×N coefficients corresponding to the forward transform of matrix blocks of N×N digital picture elements of a picture signal, further comprising a set of first, second and third stores associated with said processor module and individually controlled in read and write modes by said programmed store and a respective incoming and outgoing words transfer multiplexer and a respective store addressing multiplexer for each store controlled simultaneously by said programmed store, said incoming and outgoing word transfer multiplexers providing, in two processing stages, for all three stores, selective connection of said first store in read mode, then said second store in read mode to said input bus of said module, while during these same stages said second store in write mode then said third store in write mode are connected to the output bus of said module and said addressing multiplexers transmit to said stores, during these same stages, the successive read or write addresses of each store, as supplied by said programmed store.

3. Processor according to claim 2, further comprising a main controller circuit adapted to store said coefficients and corresponding derived picture elements, in blocks of N×N connected during an initialization stage to said first store to load each of the successive blocks of N×N coefficients into said first store and during a final stage to said third store to unload the block of N×N reconstituted picture elements from said third store.

* * * * *